(12) United States Patent
Cao et al.

(10) Patent No.: US 11,892,101 B1
(45) Date of Patent: Feb. 6, 2024

(54) ANTI-FROST HEAVING SUPPORTS AND METHODS FOR CRUDE OIL PIPELINES CROSSING PERMAFROST REGIONS

(71) Applicant: NORTHWEST INSTITUTE OF ECO-ENVIRONMENT AND RESOURCES, CAS, Gansu (CN)

(72) Inventors: Yapeng Cao, Lanzhou (CN); Guoyu Li, Lanzhou (CN); Wei Ma, Lanzhou (CN); Dun Chen, Lanzhou (CN); Kai Gao, Lanzhou (CN); Gang Wu, Lanzhou (CN)

(73) Assignee: NORTHWEST INSTITUTE OF ECO-ENVIRONMENT AND RESOURCES, CAS, Lanzhou (CN)

( * ) Notice: Subject to any disclaimer, the term of this patent is extended or adjusted under 35 U.S.C. 154(b) by 0 days.

(21) Appl. No.: 18/458,134

(22) Filed: Aug. 29, 2023

(30) Foreign Application Priority Data

Feb. 2, 2023 (CN) .......................... 202310051449.X (51) Int. Cl.
*F16L 3/02* (2006.01)
*F16L 1/026* (2006.01)

(52) U.S. Cl.
CPC .................................... *F16L 1/026* (2013.01)

(58) Field of Classification Search
CPC ...................................... F16L 3/02; F16L 3/16
See application file for complete search history.

(56) References Cited

U.S. PATENT DOCUMENTS 3,767,149 A * 10/1973 Hill .................... F16L 1/026
  248/164
3,848,639 A * 11/1974 Chen .................. F16L 3/2053
  122/510

(Continued)

FOREIGN PATENT DOCUMENTS

CN    203571225 U    4/2014
CN    108105470 A    6/2018

(Continued)

OTHER PUBLICATIONS

Decision to Grant a Patent in Chinese Application No. 202310051449.X dated Mar. 16, 2023, 5 pages.

*Primary Examiner* — Benjamin F Fiorello
(74) *Attorney, Agent, or Firm* — METIS IP LLC (57) ABSTRACT

Embodiments provide anti-frost heaving supports and methods for crude oil pipeline crossing permafrost region. The anti-frost heaving support includes a support frame. An arc-shaped frame is installed on a top of the support frame. Two sets of adjusting devices are disposed on the arc-shaped frame, each set of the adjusting devices includes a pushing device fixedly installed on the arc-shaped frame. In the anti-frost heaving support, a piston plate compresses air inside the sealing frame so that a compressional force of an elastic plate and a stressed plate on the pipeline increases. When the compressional force increases, the elastic plate deforms to make a moving rod to move towards to an interior of the sealing frame. When moving on a tilted surface of a tilting plate, the moving rod pushes the tilting plate to move. The tilting plate pushes the sealing plate to be opened to release the air inside the sealing frame, thereby reducing the compressive force exerted by the stressed plate on the pipeline.

9 Claims, 8 Drawing Sheets

(56) References Cited

U.S. PATENT DOCUMENTS

| | | | | | |
|---|---|---|---|---|---|
| 3,863,679 | A | * | 2/1975 | Young .................... | F16L 1/026 |
| | | | | | 285/123.14 |
| 3,903,704 | A | * | 9/1975 | Spiridonov ............ | F16L 1/201 |
| | | | | | 267/74 |
| 4,679,755 | A | * | 7/1987 | Marsault ................... | F16L 3/18 |
| | | | | | 248/65 |
| 2016/0340859 | A1 | * | 11/2016 | Lisin ....................... | F16L 57/00 |

FOREIGN PATENT DOCUMENTS

| | | | |
|---|---|---|---|
| CN | 110220047 | A | 9/2019 |
| CN | 113700981 | A | 11/2021 |
| CN | 216976025 | U | 7/2022 |
| CN | 114941751 | A | 8/2022 |
| CN | 115199822 | A | 10/2022 |
| CN | 217874519 | U | 11/2022 |
| RU | 85974 | U1 | 8/2009 |

* cited by examiner

FIG. 8

ANTI-FROST HEAVING SUPPORTS AND METHODS FOR CRUDE OIL PIPELINES CROSSING PERMAFROST REGIONS

CROSS-REFERENCE TO RELATED APPLICATIONS

This application claims priority to Chinese application No. 202310051449.X, filed on Feb. 2, 2023, the entire contents of which are incorporated herein by reference.

TECHNICAL FIELD

The present disclosure relates to the field of crude oil pipelines, and in particular, to anti-frost heaving supports and methods for a crude oil pipeline crossing a permafrost region.

BACKGROUND

In a permafrost region, a thermal balance of permafrost is destroyed due to an influence of human activities, resulting in surface subsidence, which becomes a thermal thaw subsidence. A crude oil pipeline erected in the permafrost region may be supported by a support frame, so as to avoid an influence of the thaw subsidence of the permafrost on stable operation of the crude oil pipeline.

Patent Publication No. CN203571225U relates to an oil pipeline support, comprising a base, a rotating column body rotationally disposed on the base by a rotating shaft, a hoop disposed on the rotating column body, and a connecting plate disposed at a bottom of the rotating column body, and further comprising a spring. Two sides of the connecting plate are connected to one end of the spring, and the other end of the spring is connected to an inner wall of the base. Since a self-stress situation of an oil pipeline may change from time to time, the pipeline may always be in a correct installation position through spring adjustment inside the base, which ensures stability of oil pipeline transportation and helps to improve a service life of the pipeline.

In the above patent, the spring adjustment inside the base may make the pipeline always in the correct installation position, which ensures the stability of the oil pipeline transportation and helps to improve the service life of the pipeline, but when the support frame is used in a thermal thaw lake and pond in a cold region, and when a soil water content is too high, the soil freezes, expands, and rises, and the soil thaws and subsides during thawing, which leads to the support frame not being able to maintain a stable height, so that the support frame is not capable of playing a stable pipeline support effect on a crude oil pipeline.

SUMMARY

One of the embodiments of the present disclosure provides anti-frost heaving supports for a crude oil pipeline crossing a permafrost region. The anti-frost heaving support includes a support frame. An arc-shaped frame is installed on a top of the support frame. Two sets of adjusting devices are disposed on the arc-shaped frame. Each set of the adjusting devices includes a pushing device. The pushing device is fixedly installed on the arc-shaped frame. A sealing frame is installed on an output end of the pushing device. A piston plate is slidably installed on an inner wall of the sealing frame. A support rod is fixedly installed on an outer surface of the piston plate. A stressed plate is installed on a top of the support rod through an elastic plate. A moving rod is slidably installed in an interior of the support rod. A tilting plate is slidably installed on an inner surface of the piston plate. The sealing frame is provided with an exhaust port. A sealing plate is rotationally installed at the exhaust port. An air pump is fixedly installed on the arc-shaped frame. The air pump is connected to an interior of the sealing frame through a connecting pipe.

BRIEF DESCRIPTION OF THE DRAWINGS

The present disclosure will be further illustrated by way of exemplary embodiments, which will be described in detail by way of the accompanying drawings. These embodiments are not limiting, and in these embodiments the same numbering indicates the same structure, wherein.

In the Figures, 1, support frame; 2, arc-shaped frame; 31, pushing device; 32, sealing frame; 33, piston plate; 34, support rod; 35, sealing plate; 36, elastic plate; 37, stressed plate; 38, moving rod; 39, tilting plate; 41, air pump; 42, connecting pipe; 51, fixing frame; 52, circular block; 53, swinging plate; 54, pushing plate; 55, control switch; 56, electric actuator; 57, upper support plate; 58, lower support plate; 61, arc-shaped plate; 62, fixing rod; 63, bending plate; 71, hot air blower; 72, jet plate; 73, rotating plate; 74, bump; 75, arc-shaped flicking plate; 76, collision block; 8, temperature detection device.

DETAILED DESCRIPTION

In order to more clearly illustrate the technical solutions of the embodiments of the present disclosure, the following will be a brief description of the accompanying drawings that need to be used in the description of the embodiments. It will be apparent that the accompanying drawings in the following description are only examples or embodiments of the present disclosure, and that other similar scenarios may be applied to the present disclosure by those of ordinary skill in the art, without creative effort. Unless obviously obtained from the context or the context illustrates otherwise, the same numeral in the drawings refers to the same structure or operation.

It should be understood that the terms "system," "device," "unit," and/or "module" used in the present disclosure are used to distinguish different components, elements, parts, or assemblies at different levels. However, if other terms may achieve the same purpose, they may be replaced with other expressions.

As shown in the present disclosure and the claims, unless the context clearly indicates otherwise, the terms "one," "a," "an," "one kind," and/or "the" are not limited to singular and may also include plural. Generally, the terms "including" and "comprising" merely indicate the inclusion of specifically identified steps and elements, and these steps and elements do not constitute an exclusive listing. The methods or devices may also include other steps or elements.

Figure 1:
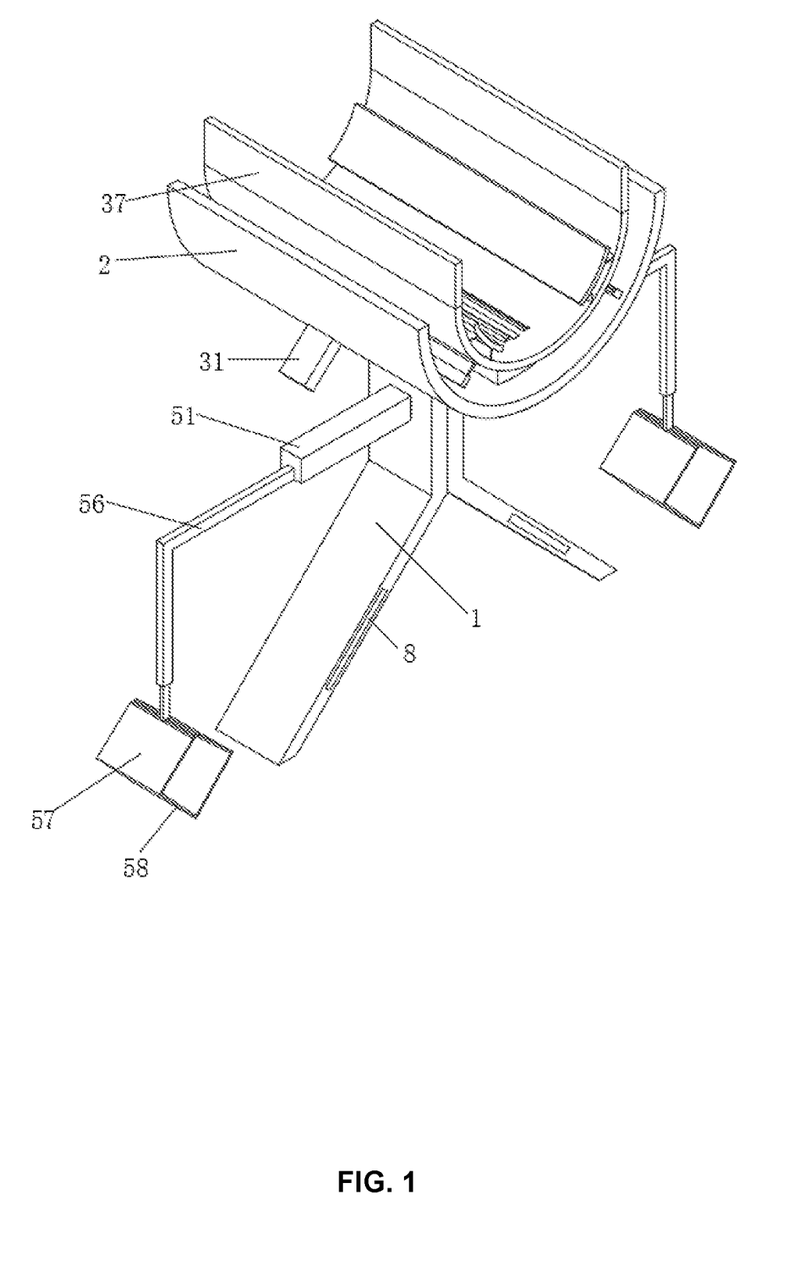
FIG. 1 is a schematic diagram illustrating an exemplary structure of an anti-frost heaving support for a crude oil pipeline crossing a permafrost region according to some embodiments of the present disclosure.
Figure 2:
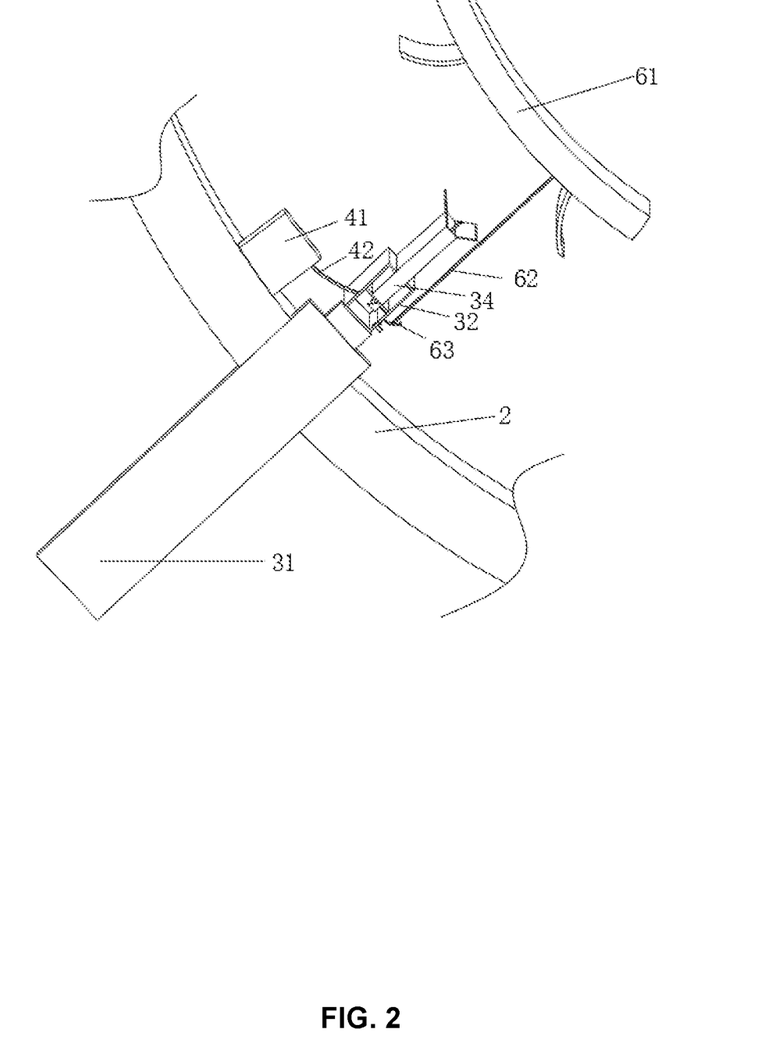
FIG. 2 is a schematic diagram illustrating an exemplary structure of an adjusting device and an arch-shaped plate according to some embodiments of the present disclosure.
Figure 3:
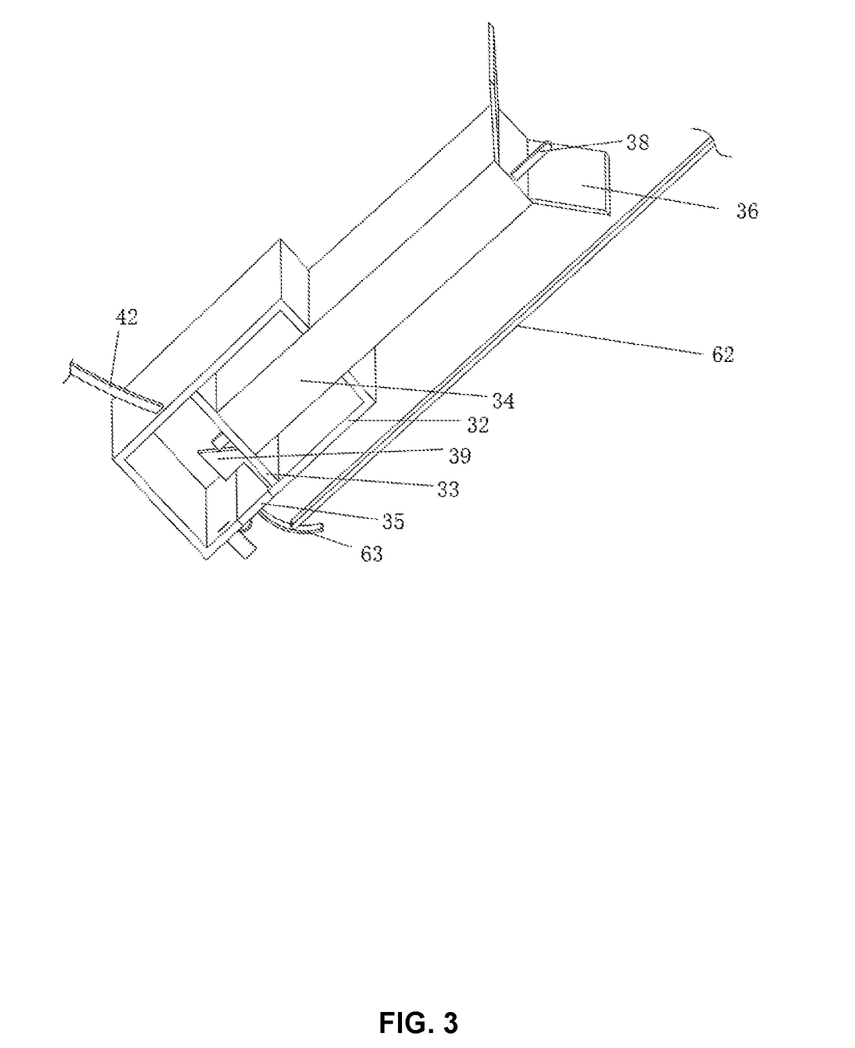
FIG. 3 is a schematic diagram illustrating an exemplary structure of an interior of a sealing frame according to some embodiments of the present disclosure.

FIG. 1 is a schematic diagram illustrating an exemplary structure of an anti-frost heaving support and method for a crude oil pipeline crossing a permafrost region according to some embodiments of the present disclosure. FIG. 2 is a schematic diagram illustrating an exemplary structure of an adjusting device and an arch-shaped plate according to some embodiments of the present disclosure. FIG. 3 is a schematic diagram illustrating an exemplary structure of an interior of a sealing frame according to some embodiments of the present disclosure.

In some embodiments, as shown in FIGS. 1-3, the anti-frost heaving support for a crude oil pipeline crossing a permafrost region includes a support frame 1. An arc-shaped frame 2 is installed on a top of the support frame 1, and two sets of adjusting devices are disposed on the arc-shaped frame 2. Each set of the adjusting devices includes a pushing device 31, which is fixedly installed on the arc-shaped frame 1. A sealing frame 32 is installed on an output end of the pushing device 31. A piston plate 33 is slidably installed on an inner wall of the sealing frame 32. A support rod 34 is fixedly installed on an outer surface of the piston plate 33. A stressed plate 37 is installed on a top of the support rod 34 through an elastic plate 36. A moving rod 38 is slidably installed in an interior of the support rod 34. A tilting plate 39 is slidably installed on an inner surface of the piston plate 33. The sealing frame 32 is provided with an exhaust port (not shown), and a sealing plate 35 is rotationally installed at the exhaust port, i.e., rotating shafts are symmetrically disposed on two sides of the sealing plate 35, and the sealing plate 35 is rotationally installed on a bottom plate of the sealing frame 32 through the rotating shafts.

In some embodiments, when moving upwards, the arc-shaped frame 2 drives the pushing device 31 and the sealing frame 32 to move upwards. When moving upwards, the sealing frame 32 drives the piston plate 33 and the support rod 34 to move upwards. When moving upwards, the support rod 34 drives the elastic plate 36 moves upwards. Under the action of a counteracting force exerted by the elastic plate 36, the support rod 34 and the piston plate 33 move relatively downwards along the sealing frame 32, so that the piston plate 33 compresses air inside the sealing frame 32. When compressed, the elastic plate 36 deforms, so that the stressed plate 37 pushes the moving rod 38 to move downwards. When moving downwards, the moving rod 38 comes into contact with a tilted surface of the tilting plate 39, so that the moving rod 38 pushes the tilting plate 39 to move downwards along an inner surface of the piston plate 33, a bottom of the tilting plate 39 drives the sealing plate 35 to rotate, and the exhaust port of the sealing frame 32 is opened, thereby releasing the air inside the sealing frame 32. In this way, a compressional force exerted by the stressed plate 37 on the pipeline is reduced, thereby ensuring stability of the pipeline and preventing any adverse impact on the support of the pipeline caused by soil expansion.

In some embodiments, a reset spring is disposed between the sealing plate 35 and the sealing frame 32 to reset the sealing plate 35. As shown in FIG. 3, a bottom surface of a bottom plate of the sealing frame 32 is provided with a limiting part (not shown) to limit a limit position of the downward rotation of the sealing plate 35. A spring is disposed between the moving rod 38 and the interior of the support rod 34, and an air pump 41 is fixedly installed on the arc-shaped frame 2, and the air pump 41 is connected to an interior of the sealing frame 32 through a connecting pipe 42. The interior of the sealing frame 32 is filled with air through the air pump 41, so that the piston plate 33, the support rod 34, and the stressed plate 37 supports the pipeline. Further, a check valve is disposed in an interior of the connecting pipe 42, so that the air inside the air pump 41 may only flow unidirectionally towards the interior of the sealing frame 32.

Figure 4:
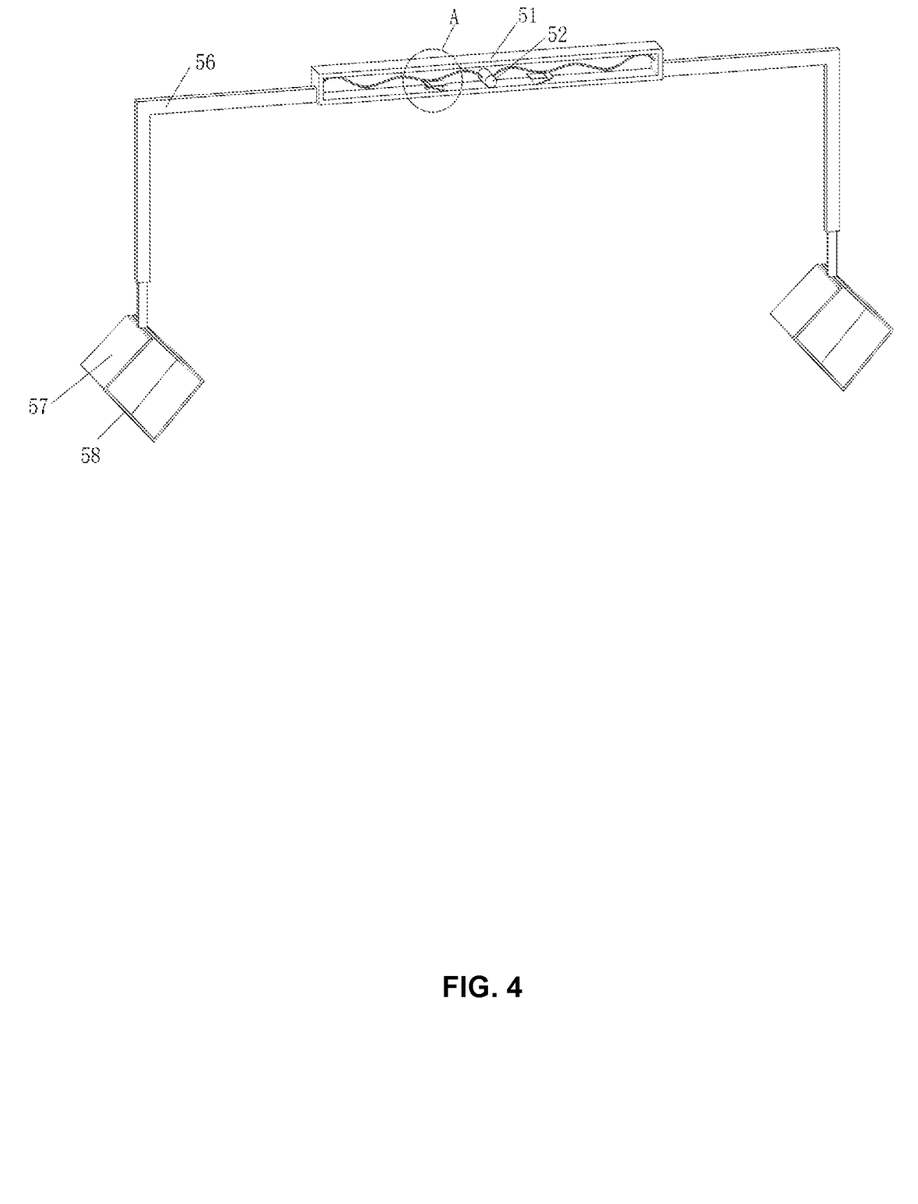
FIG. 4 is a schematic diagram illustrating an exemplary structure of an interior of a fixing frame according to some embodiments of the present disclosure.
Figure 5:
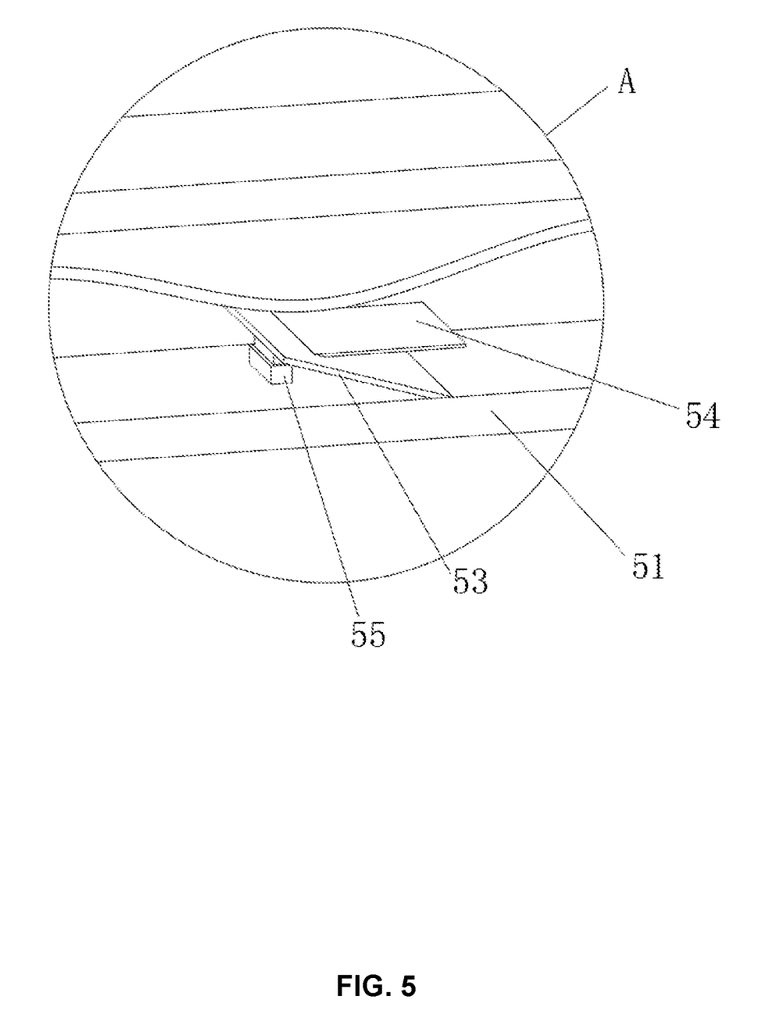
FIG. 5 is a schematic diagram of a structure of region A in FIG. 2.

FIG. 4 is a schematic diagram illustrating an exemplary structure of an interior of a fixing frame according to some embodiments of the present disclosure. FIG. 5 is a schematic diagram of a structure of region A in FIG. 2.

In some embodiments, as shown in FIGS. 4 and 5, a balancing device is disposed on the support frame 1. The balancing device includes a fixing frame 51. The fixing frame 51 is transversely installed through the support frame 1. A circular block 52 is disposed at an inner middle position of the fixing frame 51. Two sides of the circular block 52 are connected with wavy flicking plates. A swinging plate 53 is disposed on each of the two sides of the circular block 52. The swinging plate 53 is rotationally installed on an inner wall of the fixing frame 51. A pushing plate 54 is fixedly installed on a top of the swinging plate 53. The pushing plate 54 is located at a bottom of the flicking plates. A control switch 55 is disposed at a bottom of the swinging plate 53. An electric actuator 56 is fixedly installed on an outer wall on each of two sides of the fixing frame 51. The control switch 55 is electrically connected to the electric actuator 56. The control switch 55 is a press-type switch. The electric actuator 56 is turned on when a control end of the control switch 55 is pressed by the swinging plate 53.

In some embodiments, as shown in FIG. 5, a four-plate support device is disposed at an output end of the electric actuator 56, the four-plate support device includes two upper support plates 57 and two lower support plates 58, top ends of the two upper support plates 57 are articulated with the output end of the electric actuator 56, and a bottom end of each of the upper support plates 57 is articulated with a top end of one of the lower support plates 58, and bottom ends of the two lower support plates 58 are articulated with each other. When the support frame 1 tilts, the circular block 52 inside the fixing frame 51 moves to a tilted side, so that the flicking plate on the tilted side of the circular block 52 contacts the pushing plate 54, and the swinging plate 53 is pushed to rotate by the pushing plate 54, and the control switch 55 is pressed when the swinging plate 53 rotates, so that the electric actuator 56 corresponding to the control switch 55 is turned on, the electric actuator 56 drives the four-plate support device to move downwards, and the four-plate support device contacts the ground. Under the action of a counteracting force of the ground on the four-plate support device, the electric actuator 56 pushes a tilted side of the support frame 1 to move upwards, so as to keep the support frame 1 horizontal and avoid the tilting of the support frame 1 from affecting the support of the pipeline.

In some embodiments of the present disclosure, the structural design of the four-plate support device is adopted, which can play a good balance support role in a thermal thaw lake and pond region of the cold region. The entire four-plate support device works steadily and has a long service life. Specifically, when the electric actuator 56 drives the four-plate support device to move downwards to support the ground, the two upper support plates 57 and two lower support plates 58 remain horizontal to increase a contact area with the ground to ensure a good support effect. When the soil gets frozen due to the excessive high moisture content of the thermal thaw lake and pond region, the soil freezes, expands, and rises, which causes the support frame 1 to drive the electric actuator 56 to move upwards (referred to as a frost-heaving phenomenon). At this time, if the output end of the electric actuator 56 is firmly embedded in the soil, the electric actuator 56 may be damaged due to an excessive load. However, the structural design of the four-plate support device is adopted in the embodiments of the present disclosure. When the support frame 1 drives the electric actuator 56 to move upwards, the two upper support plates 57 and two lower support plates 58 of the four-plate support device undergo adaptive deformation, and it is convenient for the electric actuator 56 to move upwards by deforming into a vertical state, thereby effectively avoiding damage to the electric actuator 56.

Figure 6:
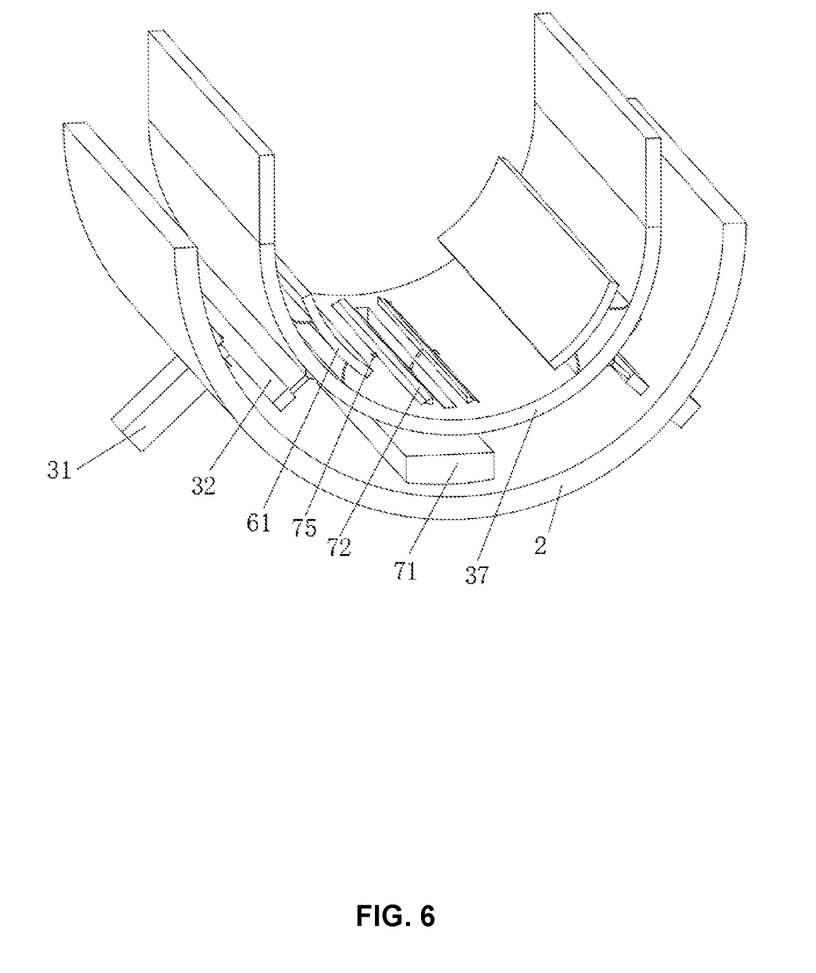
FIG. 6 is a schematic diagram illustrating an exemplary structure of a combined installation of an arc-shaped frame, a stressed plate, and an arc-shaped plate according to some embodiments of the present disclosure.

FIG. 6 is a schematic diagram illustrating an exemplary structure of a combined installation of an arc-shaped frame, a stressed plate, and an arc-shaped plate according to some embodiments of the present disclosure.

In some embodiments, as shown in FIG. 6, two sets of force splitting devices are disposed on a surface of the stressed plate 37. Each of the two sets of force splitting devices includes an arc-shaped plate 61. The arc-shaped plate 61 is installed on an inner wall of the stressed plate 37 through an elastic member (not shown). A fixing rod 62 is fixedly installed at a bottom of the arc-shaped plate 61. A bending plate 63 is fixedly installed on an outer side surface of the sealing plate 35. An outer end of the fixing rod 62 rests against the bending plate, which is used to open the sealing plate 35. When the arc-shaped frame 2 and the support frame 1 tilt, the arc-shaped plate 61 on a side with a relatively great force compresses the elastic member to generate deformation, so that the arc-shaped plate 61 moves. When moving, the arc-shaped plate 61 drives the fixing rod 62 to move. When moving, the fixing rod 62 rests against the bending plate 63 and push the sealing plate 35 to be opened. When the sealing plate 35 is opened, a portion of the air inside the sealing frame 32 is released, so that the force on two sides of the pipeline is consistent and the damage to the pipeline caused by inconsistent force may be avoided.

In some embodiments, an anti-slip layer is disposed on a surface of the arc-shaped plate, and a force of friction with the pipeline may be increased through the anti-slip layer.

In some embodiments, as shown in FIG. 6, an anti-freezing device is disposed on the arc-shaped frame 2. The anti-freezing device includes a hot air blower 71. A jet plate 72 is fixedly installed on a surface of the stressed plate 37 through a bracket. The hot air blower 71 is connected to an interior of the jet plate 72 through an air duct. A sewage discharge port (not shown) is opened at a middle position of a bottom of the stressed plate 37. A temperature detection device 8 is disposed in an interior of the support frame 1. A detection module and a control module are disposed in an interior of the temperature detection device. The control module is electrically connected to the hot air blower 71, and the temperature detection device 8 turns on the hot air blower 71 when a temperature is smaller than a set threshold, so that hot air generated by the hot air blower 71 is sprayed from the jet plate 72 through the air duct, and the hot air sprayed from the jet plate 72 melts ice on the stressed plate 37 (and melted water flows downwardly through the sewage outlet), which avoids the icing on the stressed plate 37 and the arc-shaped plate 61. The icing affects the movement of the stressed plate 37 and the arc-shaped plate 61. In some embodiments, the sewage outlet may be an elongated opening, disposed at the middle position of the bottom of the stressed plate 37 along an axial direction of the stressed plate 37, and a length of the sewage outlet is smaller than a length of the stressed plate 37 in an axial direction.

Figure 7:
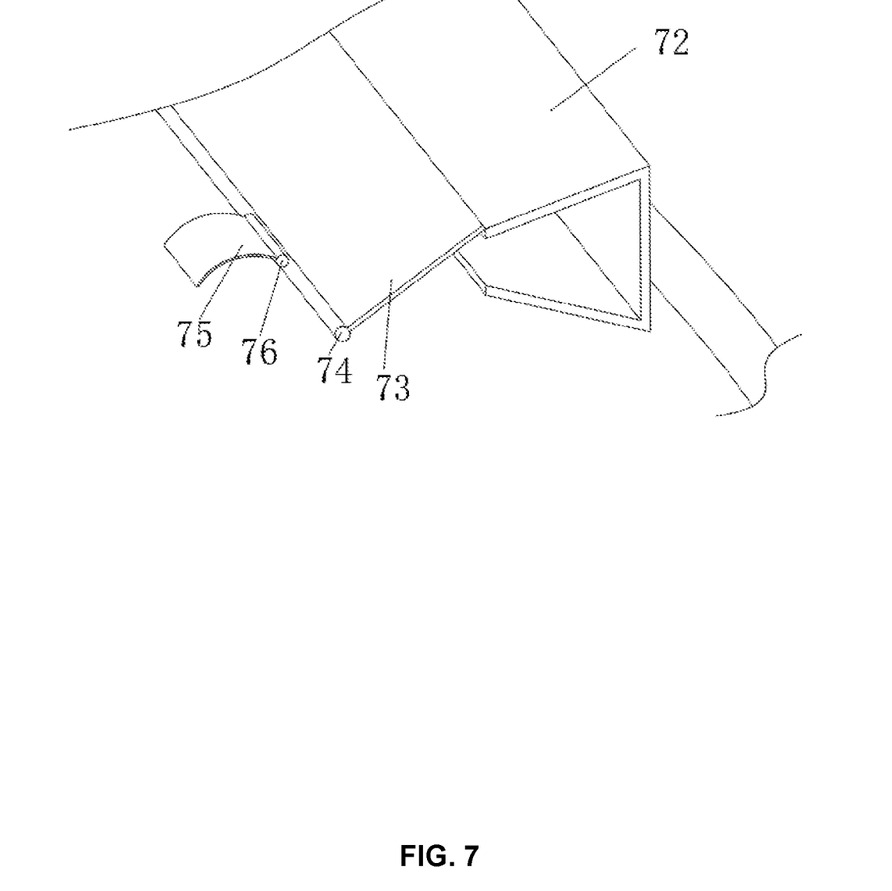
FIG. 7 is a schematic diagram illustrating an exemplary structure of a jet plate according to some embodiments of the present disclosure.

FIG. 7 is a schematic diagram illustrating an exemplary structure of a jet plate according to some embodiments of the present disclosure.

In some embodiments, as shown in FIG. 7, a rotating plate 73 is rotationally installed on the jet plate 72. A bump 74 is fixedly installed on a side of the rotating plate 73 away from the jet plate 72. An arc-shaped flicking plate 75 is fixedly installed on the surface of the stressed plate 37, and a collision block 76 is fixedly installed on a top of the arc-shaped flicking plate 75. The air sprayed from the jet plate 72 blows the rotating plate 73 to rotate. When the rotating plate 73 rotates, the bump 74 on the rotating plate 73 hits the collision block 76 on the arc-shaped flicking plate 75, the collision block 76 drives the arc-shaped flicking plate 75 to vibrate, and the arc-shaped flicking plate 75 drives the stressed plate 37 and the arc-shaped plate 61 to vibrate, thereby enhancing the ice-breaking effect.

During working or usage, when the crude oil pipeline is supported, the support frame 1 is installed in the soil to make the crude oil pipeline to be located in the interior of the stressed plate 37. An air supply pressure of the air pump 41 is set to inflate the interior of the sealing frame 32. The air pump 41 is an air pump capable of maintaining a set pressure, which is capable of maintaining a constant pressure value inside the sealing frame 32. When the soil freezes and expands, the support frame 1 and the arc-shaped frame 2 move upwards. When moving upwards, the arc-shaped frame 2 drives the pushing device 31 and the sealing frame 32 to move upwards. When moving upwards, the sealing frame 32 drives the piston plate 33 and the support rod 34 to move upwards. When moving upwards, the support rod 34 drives the elastic plate 36 and the stressed plate 37 to move upwards. Under the action of the counteracting force, the piston plate 33 moves towards a bottom of the sealing frame 32, so that the piston plate 33 compresses the air inside the sealing frame 32 (at this time, the internal air pressure of the sealing frame 32 is increased). When compressed, the elastic plate 36 deforms, so that the stressed plate 37 pushes the moving rod 38 to move. When moving, the moving rod 38 comes into contact with the tilted surface of the tilting plate 39, so that the moving rod 38 pushes the tilting plate 39 to move. When moving, the tilting plate 39 drives the sealing plate 35 to rotate. When the sealing plate 35 rotates, the sealing frame 32 may be opened, and a portion of air inside of the sealing frame 32 may be released (with the release of the air, the internal air pressure inside the sealing frame 32 decreases, so that the piston plate 33 and the support rod 34 continues to move towards the bottom of the sealing frame 32 for a certain distance, as a result, a top end of the moving rod 38 loses a top contact force with the stressed plate 37, and the sealing plate 35 is capable of being closed under the action of the reset spring), thereby avoid excessive compression of the stressed plate 37 on the pipeline.

When the support frame 1 moves and tilts, the circular block 52 inside the fixing frame 51 moves to the tilted side, so that the flicking plate (not shown) on the tilted side of the circular block 52 contacts the pushing plate 54, and the swinging plate 53 is pushed to rotate by the pushing plate 54, and the control switch 55 is pressed when the swinging plate 53 rotates, so that the control switch 55 turns on the electric actuator 56 on a side corresponding to the control switch 55, the electric actuator 56 drives the four-plate support device to move downwards, and the four-plate support device contacts the ground. Under the action of the counteracting force of the ground on the four-plate support device, the electric actuator 56 pushes the tilted side of the support frame 1 to move upwards, so as to keep the support frame 1 horizontal.

In some embodiments, the anti-frost heaving support further includes a processor and at least one distributed pressure sensor. The processor is configured to obtain a current pressure on at least one region of the stressed plate 37, determine a pressure distribution of the stressed plate 37 based on the at least one distributed pressure sensor, and determine a hot air temperature and a jet power of the hot air blower 71 based on the pressure distribution of the stressed plate 37.

Distributed refers to a way the at least one pressure sensor is disposed at an interval. For example, the at least one pressure sensor may be linearly distributed at an interval, rectangularly distributed at an interval, circularly distribution at an interval, etc. The pressure sensor refers to a component used to determine the pressure distribution of the stressed plate 37. For example, the pressure sensor includes a strain gauge pressure sensor, a piezoresistive pressure sensor, or a capacitive pressure sensor.

The pressure distribution of the stressed plate refers to pressures on different regions of the stressed plate 37. For example, the pressure distribution of the stressed plate pressure may be pressures distributed on each region of the stressed plate 37 by dividing the force plate 37 into a grid pattern such as a 3×3 or 4×4 grids.

In some embodiments, the processor may determine the pressure distribution of the stressed plate based on pressure data collected by pressure sensors distributed in at least one region of the stressed plate 37.

The hot air temperature is a temperature of an airflow ejected by the hot air blower 71.

The jet power refers to a power used by the hot air blower 71 to eject the airflow. For example, the higher the jet power is, the higher the airflow ejected by the hot air blower 71 is.

In some embodiments, the processor may determine the hot air temperature and the jet power of the hot air blower 71 by means of vector retrieval based on the pressure distribution of the stressed plate. For example, the processor may construct a vector to be matched based on the pressure distribution of the stressed plate. The processor may perform a retrieval in a vector database based on the vector to be matched, obtain a reference vector whose vector distance from the vector to be matched satisfies a distance threshold, and determine a historical hot air temperature and a historical jet power corresponding to the reference vector as the hot air temperature and the desired jet power currently required by the hot air blower 71. The vector database is used to store a plurality of historical vectors and historical hot air temperatures and historical jet powers corresponding to the historical vectors. The historical vectors are constructed based on historical pressure distributions of the stressed plate. In some embodiments, the anti-frost heaving support further includes a storage device. The vector database is pre-constructed based on historical data and stored in the storage device.

In some embodiments, the processor may determine the hot air temperature and the jet power of the hot air blower 71 through an air blower parameter determination model. More descriptions may be found in FIG. 8 and the relevant descriptions thereof.

In some embodiments of the present disclosure, the hot air temperature and the jet power of the current hot air blower 71 are determined by the pressure distribution of the stressed plate, so that hot air generated by the hot air blower 71 can quickly melt the ice on the stressed plate 37.

In some embodiments, the anti-frost heaving support further includes a flow sensor. The flow sensor is disposed inside the sewage outlet. The processor is configured to obtain a water flow feature at at least one moment through the flow sensor in response to a determination that the hot air blower 71 is turned on and adjust the hot air temperature and the jet power of the hot air blower 71 based on the water flow feature at the at least one moment.

The flow sensor refers to a component that detects a flow volume of sewage at the sewage outlet. For example, the flow sensor includes a magnetic flow sensor, a turbine flow sensor, a differential pressure flow sensor, an ultrasonic flow sensor, or a thermal flow sensor.

In some embodiments, the flow sensor may be disposed inside the sewage outlet in a plurality of ways. For example, the flow sensor is fixedly connected or detachably connected to an inner side wall of the sewage outlet.

The water flow feature refers to data information used to characterize a feature of sewage at the sewage outlet. For example, the water flow feature includes a flow volume, a flow velocity, etc. of the sewage discharged from the sewage outlet.

The at least one moment refers to a point in a historical time (including a current time) at which the flow sensor needs to obtain the flow volume of the sewage at the sewage outlet. For example, the at least one moment includes a point in time, a plurality of discrete points in time, or a continuous time period.

In some embodiments, when the flow sensor detects that the flow volume of the sewage discharged at the sewage outlet is 0 in a first preset time period, the processor may determine that the hot air temperature or the jet power of the hot air blower 71 is insufficient to melt the ice on the stressed plate 37. At this time, the processor increases the hot air temperature and the jet power of the hot air blower 71.

In some embodiments, when the flow sensor detects that the flow volume of the sewage discharged at the sewage outlet is 0 in a second preset time period, the processor determines that there is an error in the pressure distribution of the pressure plate (e.g., an error caused by a false alarm, etc.), and there is actually no ice on the pressure plate 37. At this time, the processor controls the hot air blower 71 to stop running.

In some embodiments, when the flow sensor detects that the flow volume of the sewage discharged at the sewage outlet is smaller than a preset water flow threshold in a third preset time period, the processor determines that the jet power is relatively low. At this time, the processor controls the hot air blower 71 to increase the hot air temperature and the jet power.

In some embodiments, when the flow sensor detects that the flow volume of the sewage discharged at the sewage outlet decreases gradually, the processor determines that the ice on the stressed plate 37 is close to completely melting.

At this time, the processor controls the hot air blower 71 to reduce the hot air temperature and the jet power until the hot air blower 71 stops running. In some embodiments, the processor may also adjust the water flow feature according to other rules, which are not limited herein.

In some embodiments, a duration of the second preset time period may be greater than a duration of the first preset time period. In some embodiments, a duration of the third preset time period may be determined based on a predicted icing feature. For example, the greater the amount of predicted icing of each region in the predicted icing feature, the smaller the duration of the third preset time period may be. The first preset time period, the second preset time period, the third preset time period, and the preset water flow threshold may be preset by an operator based on historical experience. More descriptions regarding the predicted icing feature may be found in FIG. 8 and the relevant descriptions thereof.

In some embodiments of the present disclosure, the hot air temperature and the jet power of the hot air blower 71 are adjusted based on the water flow feature (e.g., flow volume) of the sewage discharged at the sewage outlet, so that the working condition of the hot air blower 71 match with an icing situation of the stressed plate 37, prevents the hot air blower 71 from continuing to run with a relatively high power when there is no ice or when the ice on the stressed plate 37 gradually diminishes, avoids the stressed plate 37 from being burned out due to an excessive temperature, and energy can be saved at the same time.

In some embodiments, the processor is further configured to control a push distance (i.e., a degree of opening and closing) of the electric actuator 56 based on a pressing force on the control switch 55 when the swinging plate 53 rotates.

The pressing force is a pressure exerted by the swinging plate 53 on the control switch 55. In some embodiments, the control switch 55 may sense the pressing force. The control switch 55 may include a pressure sensor, such as a strain gauge pressure sensor, a piezoresistive pressure sensor, or a capacitive pressure sensor. In some embodiments, the control switch 55 may be used to sense a magnitude of the pressing force and a duration of pressing on the control switch 55 when the swinging plate 53 rotates.

In some embodiments, when the support frame 1 tilts, the circular block 52 moves to the tilted side, so that the flicking plate on the tilted side of the circular block 52 exerts pressure on the pushing plate 54. At this time, the pushing plate 54 pushes the swinging plate 53 to rotate and press on the control switch 55. During this process, the greater the degree of tilting of the support frame 1 is, the greater the magnitude of the pressing force applied by the swinging plate 53 on the control switch 55 that the control switch 55 senses or the longer the duration of the pressing of the swinging plate 53 on the control switch 55 that the control switch 55 senses is, and the larger the push distance (i.e., the degree of opening and closing) of the electric actuator 56 controlled by the processor is.

In some embodiments, when the support frame 1 tilts, the processor controls the push distance of the electric actuator 56 (i.e., the degree of opening and closing) based on the magnitude of the pressing force or the duration of the pressing on the control switch 55, so that the support frame 1 keeps horizontal again and the influence of the tilting of the support frame 1 on the support of the pipeline may be avoided.

In some embodiments, the anti-frost heaving support further includes an air pressure sensor. The processor is further configured to control the air pump 41 to fill the interior of the sealing frame 32 with air based on air pressure data of air inside the sealing frame 32 obtained by the air pressure sensor. More descriptions regarding the air pump 41 and the sealing frame 32 may be found in FIG. 5 and the relevant descriptions thereof.

The air pressure sensor refers to a component that detects the air pressure data of the air inside the sealing frame 32. For example, the air pressure sensor includes a gauge pressure sensor, an absolute pressure sensor, or a differential pressure sensor. In some embodiments, the air pressure sensor may be fixedly connected or detachably connected to the interior of the sealing frame 32. More descriptions regarding the interior of the sealing frame may be found above, which is not repeated herein.

The air pressure data refers to data information related to the air pressure inside the sealing frame 32, for example, the air pressure inside the sealing frame, a trend of air pressure change, a rate of air pressure change, etc.

In some embodiments, when the air pressure sensor detects that the air pressure inside the sealing frame 32 is smaller than a preset air pressure threshold, the processor controls the air pump 41 to fill the interior of the sealing frame 32 with air until the air pressure inside the sealing frame 32 is greater than or equal to the preset air pressure threshold. The preset air pressure threshold may be preset by the operator based on historical experience.

In some embodiments, the air pressure sensor includes a first air pressure sensor and a second air pressure sensor respectively disposed inside the sealing frames 32 of two adjusting devices, and the processor fills one of the two sealing frames 32 with air based on the air pressures detected by the first air pressure sensor and the second air pressure sensor. For example, when the air pressure detected by the first air pressure sensor is greater than the air pressure detected by the second air pressure sensor, the processor determines that the air pressure inside the sealing frame 32 corresponding to the first air pressure sensor is greater than air pressure inside the sealing frame 32 corresponding to the second air pressure sensor, and the processor controls the air pump 41 corresponding to the second air pressure sensor to fill the sealing frame 32 corresponding to the second air pressure sensor with air until a difference of the air pressures inside the two sealing frames 32 is zero.

In some embodiments, the processor controls the air pump 41 to fill the interior of one of the sealing frames 32 with air based on the air pressure data inside the two sealing frames 32, so that the piston plate 33, the support rod 34, and the stressed plate 37 supports the pipeline, and the pipeline is prevented from tilting.

In some embodiments, the anti-frost heaving support further includes a wind force sensor. The wind force sensor is disposed in the connecting pipe 42. The processor is further configured to determine an air pump operating sequence and a sealing frame pressure sequence of the air pump 41 in a preset time period of air delivery according to wind force sensing data and air pressure data obtained by the wind force sensor in the preset time period of air delivery, respectively. The processor determines a predicted frost-heaving feature based on the air pump operating sequence of the air pump 41 in the preset time period of air delivery, determines the predicted icing feature of the stressed plate 37 based on the pressure distribution of the stressed plate and the predicted frost-heaving feature, and determines the hot air temperature and the jet power of the hot air blower 71 based on the predicted icing feature. More descriptions regarding the hot air temperature and the jet power may be found above.

The wind force sensor refers to a component used to detect wind force data of the air pump 41 in the preset time period of air delivery. For example, the wind force sensor includes a resistive wind force sensor, a voltage wind force sensor, etc. The preset time period of air delivery refers to an operating time period during which the air pump 41 operates to generate a wind force, and the preset time period of air delivery may be determined by the operator based on historical experience.

The wind force data refers to data related to the wind force generated by the air pump 41, for example, a wind intensity, a wind pressure, an air delivery volume, etc.

In some embodiments, the air pump 41 fills the interior of the sealing frame 32 with air through the connecting pipe 42, and the wind force sensor may be disposed in the connecting pipe 42 to detect the wind force data of the air pump 41.

The air pump operating sequence is a sequence consisting of the wind force data of the air pump 41 in the preset time period of air delivery. In some embodiments, the air pump operating sequence includes at least one air delivery time interval and an air delivery volume of the at least one air delivery time interval. The air delivery time interval refers to a time interval into which the preset time period of air delivery is divided, e.g., the preset time period of air delivery is divided equally into n air delivery time intervals. For example, the air pump operating sequence may be represented by {(a1, b1, c1, . . . ), (a2, b2, c2, . . . ), . . . }, where a1, b1, and c1 respectively denote the wind intensity, the wind pressure, and the air delivery volume generated by the air pump 41 when the air pump 41 operates in a first air delivery time interval, and a2, b2, and c2 respectively denote the wind intensity, the wind pressure, and the air delivery volume generated by the air pump 41 when the air pump 41 operates in a second air delivery time interval. The air pump operating sequence is obtained by the wind force sensor.

The sealing frame pressure sequence refers to a sequence consisting of the air pressure data of the air inside the sealing frame 32 at a preset time period. For example, the sealing frame pressure sequence may be represented by (d, e, f, . . . ), where d, e, and f respectively denote the air pressure inside the sealing frame 32, the trend of air pressure change, and the rate of air pressure change in the preset time period. The sealing frame pressure sequence may be obtained by the air pressure sensor. More descriptions regarding the air pressure data may be found above.

The predicted frost-heaving feature refers to predicted data used to characterize a permafrost layer in which the anti-frost heaving support is located. For example, the predicted frost-heaving feature includes a predicted icing rate, a predicted frost-heaving rate, a predicted hardness of the permafrost, and a predicted frost degree of the permafrost of the permafrost layer in which the anti-frost heaving support is located.

The predicted icing feature refers to predicted data used to characterize the icing of the stressed plate 37, for example, a predicted amount of icing on each region of the stressed plate 37.

In some embodiments, the processor may determine the predicted icing feature through the vector database based on the air pump operating sequence, the pressure distribution of the stressed plate, and the predicted frost-heaving feature. More descriptions regarding the determining the predicted icing feature may be found above. In some embodiments, the processor may also determine the predicted frost-heaving feature and the predicted icing feature through a frost-heaving feature prediction layer and the icing feature prediction layer. More descriptions may be found in FIG. 8 and the relevant descriptions thereof.

More descriptions regarding the determining the hot air temperature and the jet power may be found above.

Figure 8:
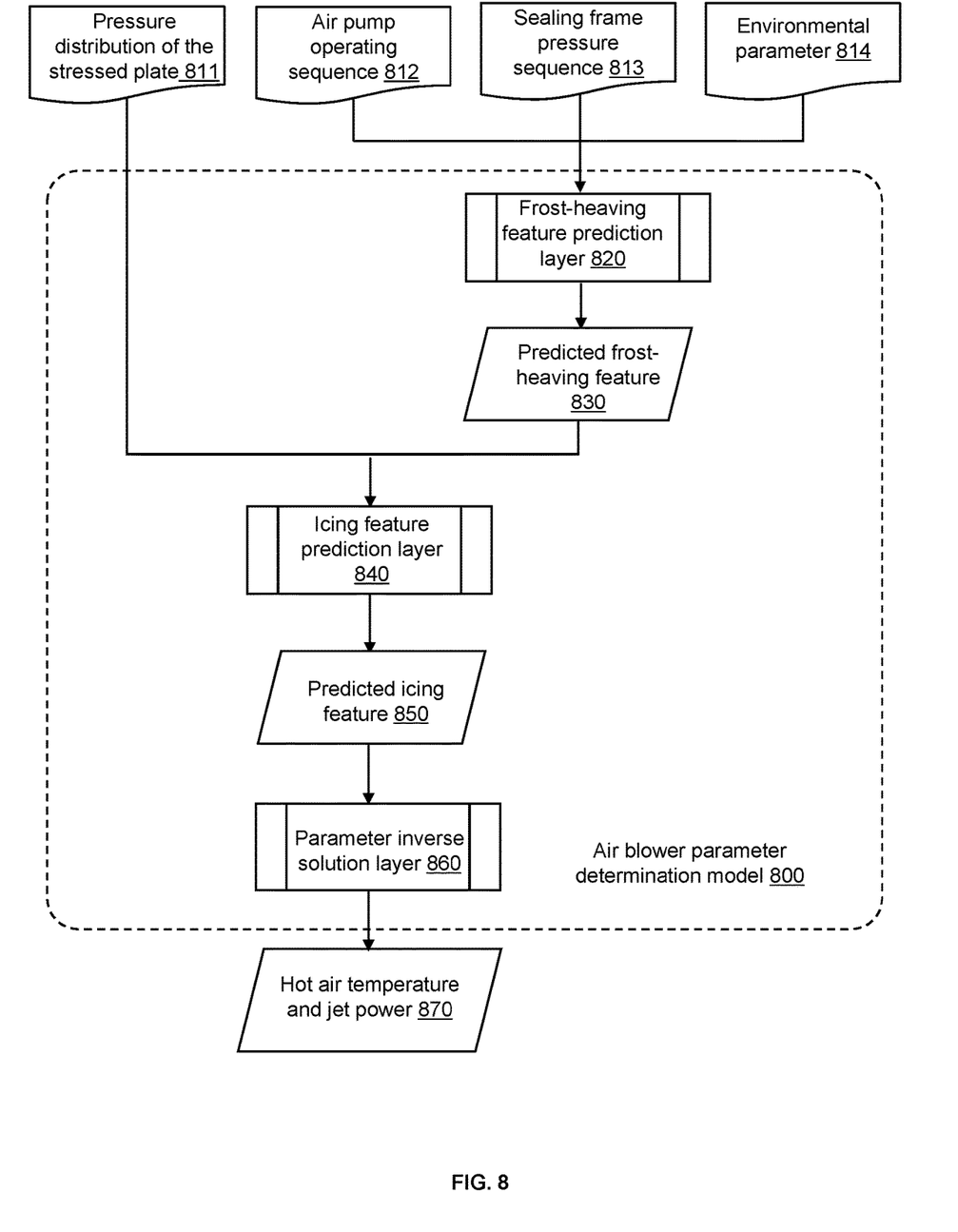
FIG. 8 is a schematic diagram illustrating an exemplary air blower parameter determination model according to some embodiments of the present disclosure.

FIG. 8 is a schematic diagram illustrating an exemplary air blower parameter determination model according to some embodiments of the present disclosure.

In some embodiments, the processor may determine a hot air temperature and a jet power 870 of the hot air blower 71 through the air blower parameter determination model 800 based on a pressure distribution of the stressed plate 811, an air pump operating sequence 812, a sealing frame pressure sequence 813, and an environmental parameter 814. The air blower parameter determination model 800 is a machine learning model.

In some embodiments, the air blower parameter determination model may be a Deep Neural Networks (DNN) model, a Convolutional Neural Network (CNN) model, or other custom model structures, or the like, or any combination thereof. In some embodiments, as shown in FIG. 8, the air blower parameter determination model 800 includes a frost-heaving feature prediction layer 820, an icing feature prediction layer 840, and a parameter inverse solution layer 860.

In some embodiments, an input of the frost-heaving feature prediction layer 820 may include the air pump operating sequence 812, the sealing frame pressure sequence 813, and the environmental parameter 814, and an output of the frost-heaving feature prediction layer 820 may include a predicted frost-heaving feature 830. More descriptions regarding the air pump operating sequence 812, the sealing frame pressure sequence 813, and the predicted frost-heaving feature 830 may be found above. In some embodiments, the frost-heaving feature prediction layer may be the Deep Neural Networks (DNN) model, the Convolutional Neural Networks (CNN) model, or other custom model structures, or the like, or any combination thereof.

The environmental parameter refers to parameter data used to describe an environment in which the anti-frost heaving support is located. For example, the environmental parameter includes an air temperature, an air humidity, a soil temperature, a soil humidity, etc., which may be obtained by a temperature sensor and a humidity sensor.

In some embodiments, an input of the icing feature prediction layer 840 may include the predicted frost-heaving feature 830 and an output of the icing feature prediction layer 840 may include a predicted icing feature 850. More descriptions regarding the predicted icing feature 850 may be found above. In some embodiments, the icing feature prediction layer may be the Deep Neural Networks (DNN) model, the Convolutional Neural Networks (CNN) model, or other custom model structures, or the like, or any combination thereof.

In some embodiments, an input of the parameter inverse solution layer 860 may include the predicted icing feature 850 and an output of the parameter inverse solution layer 860 may include the hot air temperature and the jet power 870 of the hot air blower 71. More descriptions regarding the hot air temperature and the jet power 870 may be found above. In some embodiments, the parameter inverse solution layer may be the Deep Neural Networks (DNN) model, the Convolutional Neural Networks (CNN) model, or other custom model structures, or the like, or any combination thereof.

In some embodiments, the frost-heaving feature prediction layer 820, the icing feature prediction layer 840, and the parameter inverse solution layer 860 may be obtained by training a large number of training samples with labels, respectively.

In some embodiments, the predicted frost-heaving feature 830 may be obtained by training a large number of first training samples with first labels.

In some embodiments, the first training sample include a sample air pump operating sequence, a sample sealing frame pressure sequence, and a sample environmental parameter, which are obtained based on historical data. The first label may be an actual frost-heaving feature of a permafrost layer corresponding to the first training sample. In some embodiments, the obtaining the first label includes: sampling soil within a preset neighborhood range of anti-frost heaving and obtaining the actual frost-heaving feature by measuring the soil; or obtaining the actual frost-heaving feature by performing an on-site test at a location of the anti-frost heaving. For example, the on-site test is performed to determine the actual frost-heaving feature of the anti-frost heaving by hammering nails into the soil within the preset neighborhood range of the anti-frost heaving. More descriptions regarding the preset neighborhood range may be found below.

In some embodiments, the predicted icing feature 850 may be obtained by training a large number of second training samples with second labels.

In some embodiments, the second training sample include a sample predicted frost-heaving feature and a sample pressure distribution of the stressed plate, which are obtained based on historical data. The second label may be an actual icing feature of the stressed plate 37 corresponding to the second training sample. For example, the anti-frost heaving support is removed from the permafrost and an icing situation on the stressed plate 37 is determined by means of actual measurement or experimental simulation to determine the actual icing feature.

In some embodiments, the parameter inverse solution layer 860 may be obtained by training a large number of third training samples with third labels.

In some embodiments, the third training sample include a sample predicted icing feature, which is obtained based on historical data. The third label may be an actual hot air temperature and an actual jet power of the hot air blower 71 corresponding to the third training sample. For example, the actual hot air temperature and actual jet power that are relatively effective in melting ice (e.g., relatively fast melt rate) and less likely to cause thermal expansion and contraction of the structure of the stressed plate 37 are determined as the third label.

In some embodiments, the hot air temperature and the jet power determined by the air blower parameter determination model are more accurate and reasonable, so that the hot air blower 71 may quickly melt the ice on the stressed plate 37, thereby reducing side effects of the hot air blower 71 in the process of ice melting and reducing energy consumption.

In some embodiments, the preset neighborhood range is related to a degree of dispersion of frost-heaving feature.

The preset neighborhood range refers to a region of a preset range near the location of the permafrost layer in which the anti-frost heaving support is located. For example, the preset neighborhood range may be a radius of 1 meter, 5 meters, or 10 meters from the location of the permafrost layer in which the anti-frost heaving support is located.

The frost-heaving feature refers to data used to characterize the permafrost layer in which the anti-frost heaving support is located. For example, the frost-heaving feature includes an icing rate, a frost-heaving rate, a hardness of the permafrost, and a frost degree of the permafrost of the permafrost layer in which the anti-frost heaving support is located. The degree of dispersion of frost-heaving feature refers to a degree of dispersion of the frost-heaving feature of each region of the permafrost layer. For example, the permafrost layer is divided into a grid pattern of 3×3 grids.

In some embodiments, the processor may determine the frost-heaving feature of each region of the permafrost layer based on historical data or based on soil sampling. In some embodiments, the processor may calculate, based on the frost-heaving feature (e.g., the icing rate, the frost-heaving rate) of each region of the permafrost layer, a variance of the one or more frost-heaving features (e.g., the icing rate, the frost-heaving rate) and determine the variance as the degree of dispersion of frost-heaving feature of the permafrost layer.

In some embodiments, the processor may determine the preset neighborhood range when the permafrost layer is sampled based on the degree of dispersion of frost-heaving feature. For example, the greater the degree of dispersion of frost-heaving feature of each region of the permafrost layer is, the larger the preset neighborhood range is.

In some embodiments, the soil may be sampled in a suitable range of the permafrost layer by setting the preset neighborhood range related to the frost-heaving feature dispersion, so that the actual frost-heaving feature that accurately describes the permafrost layer may be obtained, and a prediction accuracy of the frost-heaving feature layer obtained by training may be higher.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or feature described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An anti-frost heaving support for a crude oil pipeline crossing a permafrost region, comprising a support frame, wherein an arc-shaped frame is installed on a top of the support frame, two sets of adjusting devices are disposed on the arc-shaped frame, each set of the adjusting devices includes a pushing device, the pushing device is fixedly installed on the arc-shaped frame, a sealing frame is installed on an output end of the pushing device, a piston plate is slidably installed on an inner wall of the sealing frame, a support rod is fixedly installed on an outer surface of the piston plate, a stressed plate is installed on a top of the support rod through an elastic plate, a moving rod is slidably installed in an interior of the support rod, a tilting plate is slidably installed on an inner surface of the piston plate, the sealing frame is provided with an exhaust port, and a sealing plate is rotationally installed at the exhaust port; and an air pump is fixedly installed on the arc-shaped frame, and the air pump is connected to an interior of the sealing frame through a connecting pipe.

2. The anti-frost heaving support for the crude oil pipeline crossing the permafrost region of claim 1, wherein a reset spring is disposed between the sealing plate and the sealing frame, and a spring is disposed between the moving rod and the interior of the support rod.

3. The anti-frost heaving support for the crude oil pipeline crossing the permafrost region of claim 2, wherein a balancing device is disposed on the support frame, the balancing device includes a fixing frame, the fixing frame is transversely installed through the support frame, a circular block is disposed at an inner middle position of the fixing frame, two sides of the circular block are connected with wavy flicking plates, and a swinging plate is disposed on each of the two sides of the circular block, the swinging plate is rotationally installed on an inner wall of the fixing frame, a pushing plate is fixedly installed on a top of the swinging plate, the pushing plate is located at a bottom of the flicking plate, and a control switch is disposed at a bottom of the swinging plate; and an electric actuator is fixedly installed on an outer wall on each of two sides of the fixing frame, the control switch is electrically connected to the electric actuator, the control switch is a press-type switch, and the electric actuator is turned on when a control end of the control switch is pressed by the swinging plate.

4. The anti-frost heaving support for the crude oil pipeline crossing the permafrost region of claim 3, wherein a four-plate support device is disposed at an output end of the electric actuator, the four-plate support device includes two upper support plates and two lower support plates, top ends of the two upper support plates are articulated with the output end of the electric actuator, and a bottom end of each of the upper support plates is articulated with a top end of one of the lower support plates, and bottom ends of the two lower support plates are articulated with each other.

5. The anti-frost heaving support for the crude oil pipeline crossing the permafrost region of claim 4, wherein a force splitting device is disposed on the stressed plate, the force splitting device includes an arc-shaped plate, the arc-shaped plate is installed on an inner wall of the stressed plate through an elastic member, a fixing rod is fixedly installed at a bottom of the arc-shaped plate, a bending plate is fixedly installed on an outer side surface of the sealing plate, and an outer end of the fixing rod rests against the bending plate.

6. The anti-frost heaving support for the crude oil pipeline crossing the permafrost region of claim 5, wherein an anti-slip layer is disposed on a surface of the arc-shaped plate.

7. The anti-frost heaving support for the crude oil pipeline crossing the permafrost region of claim 6, wherein an anti-freezing device is disposed on the arc-shaped frame, the anti-freezing device includes a hot air blower, a jet plate is fixedly installed on a surface of the stressed plate through a bracket, the hot air blower is connected to an interior of the jet plate through an air duct, and a sewage discharge port is opened at a bottom of the stressed plate.

8. The anti-frost heaving support for the crude oil pipeline crossing the permafrost region of claim 7, wherein a rotating plate is rotationally installed on the jet plate, a bump is fixedly installed on a side of the rotating plate away from the jet plate, an arc-shaped flicking plate is fixedly installed on the surface of the stressed plate, and a collision block is fixedly installed on a top of the arc-shaped flicking plate.

9. The anti-frost heaving support for the crude oil pipeline crossing the permafrost region of claim 7, wherein a temperature detection device is disposed in an interior of the support frame, a detection module and a control module are disposed in an interior of the temperature detection device, the control module is electrically connected to the hot air blower, and the temperature detection device turns on the hot air blower when a temperature is smaller than a set threshold.

* * * * *